Nov. 14, 1939.  W. S. DIEHL  2,179,500
PITOT-STATIC TUBE
Filed Dec. 1, 1937
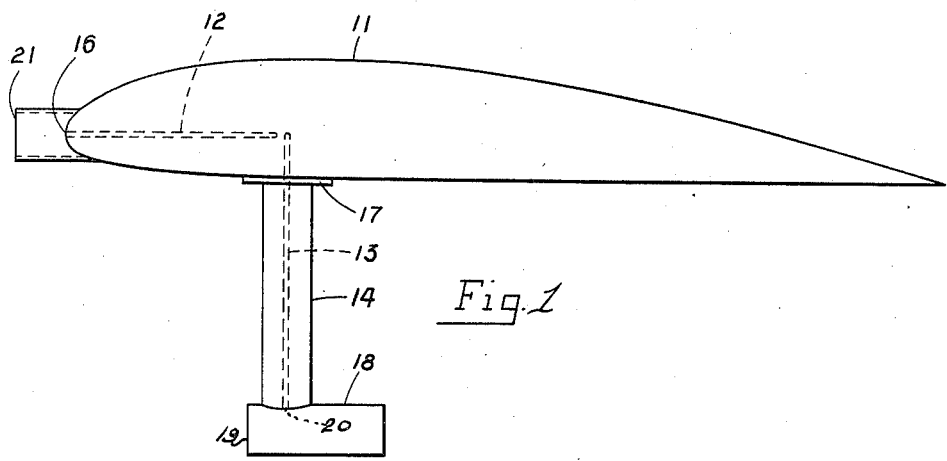
Fig. 1
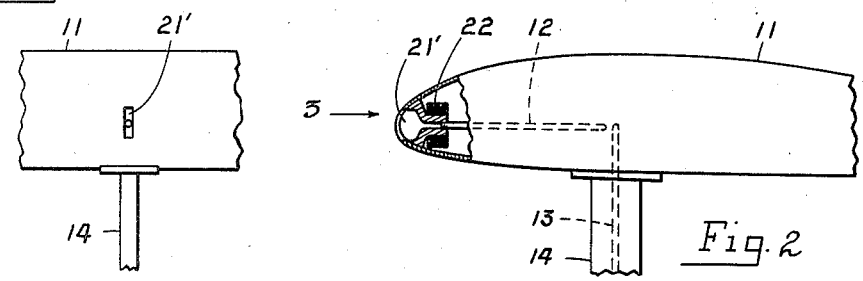
Fig. 3
Fig. 2
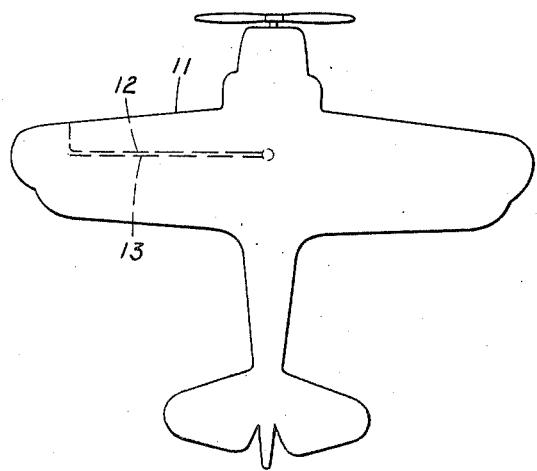
Fig. 4
INVENTOR
WALTER S. DIEHL
BY
*Ransom K. Davis*
ATTORNEY Patented Nov. 14, 1939

2,179,500

UNITED STATES PATENT OFFICE 2,179,500

PITOT-STATIC TUBE

Walter S. Diehl, United States Navy

Application December 1, 1937, Serial No. 177,544

3 Claims. (Cl. 73—212)

(Granted under the act of March 3, 1883, as amended April 30, 1928; 370 O. G. 757)

This invention relates to a Pitot-static tube, and has for an object to provide an improved Pitot-static tube having characteristics making it more accurate than the present conventional Pitot-static tubes used in measuring the air speed of aircraft.

A further object of this invention is to provide an improved Pitot-static tube which is far less inaccurate at different speeds and varying angles of flight than the conventional tube for this purpose.

Still a further object of this invention is to especially improve the static tube portion so as to assist in more closely indicating the true air speed of the aircraft on which it is mounted.

With the foregoing and other objects in view, the invention consists in the construction, combination and arrangement of parts hereinafter described and illustrated in the drawing, in which:

Fig. 1 is a side elevational view of one form of this invention;

Fig. 2 is a fragmentary partly sectional view of another form, similar to Fig. 1;

Fig. 3 is a front elevational view looking in the direction of arrow 3 on Fig. 2; and Fig. 4 is a top plan view of an airplane with this latter form installed.

There is shown at 13 the static tube of this invention as mounted on attaching plate 17 to depend from the aircraft wing 11. This static pressure tube 13 is connected through the aircraft wing 11 through a hollow streamlined strut 14. The Pitot or impact pressure tube 12 extends forwardly and terminates in an opening 16 in the leading edge of the wing 11 where the tube is exposed to the impact pressure caused by the travel of the aircraft wing 11 through the air. Extending forwardly from the leading edge about this opening 16 is a flattened tube 21 of a width substantially equal to but not much greater than the diameter of the opening 16 but of a height of from five to ten diameters.

Secured to the bottom of streamlined strut 14 is an open cylindrical tube 18 having a chamfered leading edge 19. Static pressure tube 13 terminates in an opening 20 extending into the inside of cylindrical tube 18.

In operation, the Pitot tube 12 and the static pressure tube 13 each conduct their pressure to the Pitot speed indicator in the usual conventional manner, but it has been found that the placing of the Pitot tube opening in the leading edge, as shown, allows the impact pressure to be much more accurately collected and transmitted to the indicator, even though the speed flight angle or pitch may vary a great deal. The same advantage of greatly increased accuracy under different conditions has been found to be present in the static pressure tube as a result of mounting it within the cylindrical tube.

In Fig. 2 there is a flattened tube 21' which is recessed into the leading edge of the aircraft wing instead of projecting forwardly therefrom, the advantages in increased accuracy at different speeds, as well as in variation in angle of flight or pitch, being the same.

A heating coil 22 may be provided about the end of the flattened tube 21' to prevent freezing the moisture therein, the coil 22 being either electrically heated or heated from the exhaust.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A Pitot-static tube comprising in combination, a Pitot tube, a static pressure tube, an open cylindrical tube, said static pressure tube terminating in a portion having an opening at right angles to the relative fluid motion, said static pressure tube opening being located within said open cylindrical tube, a hollow streamlined strut supporting said open cylindrical tube, said static pressure tube extending through said streamlined strut to said open cylindrical tube, an airfoil surface, said Pitot tube terminating in a portion having an opening substantially in axial alignment with the relative fluid motion in the leading edge of said airfoil surface, and a vertically flattened tube extending forwardly of the opening of said Pitot tube.

2. A Pitot-static tube comprising in combination, a Pitot tube, a static pressure tube, an open cylindrical tube, said static pressure tube terminating in a portion having an opening at right angles to the relative fluid motion, said static pressure tube opening being located within said open cylindrical tube, a hollow streamlined strut supporting said open cylindrical tube, said static pressure tube extending through said streamlined strut to said open cylindrical tube, an airfoil surface, said Pitot tube terminating in a portion having an opening substantially in axial alignment with the relative fluid motion in the leading edge of said airfoil surface, and a vertically flattened tube extending forwardly of the opening of said Pitot tube, said flattened tube extending forwardly of said airfoil surface.

3. A Pitot-static tube comprising in combination, a Pitot tube, a static pressure tube, an open cylindrical tube, said static pressure tube terminating in a portion having an opening at right angles to the relative fluid motion, said static pressure tube opening being located within said open cylindrical tube, a hollow streamlined strut supporting said open cylindrical tube, said static pressure tube extending through said streamlined strut to said open cylindrical tube, an airfoil surface, said Pitot tube terminating in a portion having an opening substantially in axial alignment with the relative fluid motion in the leading edge of said airfoil surface, and a vertically flattened tube extending forwardly of the opening of said Pitot tube, said flattened tube being recessed into the leading edge of said airfoil surface.

WALTER S. DIEHL.